US008923705B2

(12) United States Patent
Saunders et al.

(10) Patent No.: US 8,923,705 B2
(45) Date of Patent: *Dec. 30, 2014

(54) POISSON-BASED COMMUNICATION SYSTEM AND METHODS

(75) Inventors: Oliver W Saunders, Los Angeles, CA (US); Russell Kadota, Huntington Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 379 days.

This patent is subject to a terminal disclaimer.

(21) Appl. No.: 13/413,303

(22) Filed: Mar. 6, 2012

(65) Prior Publication Data

US 2013/0236194 A1 Sep. 12, 2013

(51) Int. Cl.
*H04B 10/00* (2013.01)
*H04B 10/02* (2006.01)
*H04B 10/06* (2006.01)

(52) U.S. Cl.
USPC ............ 398/163; 398/140; 398/152; 398/26; 398/27; 375/343; 375/355; 375/359

(58) Field of Classification Search
USPC ................................. 398/140, 163
See application file for complete search history.

(56) References Cited

U.S. PATENT DOCUMENTS

| | | | | |
|---|---|---|---|---|
| 2004/0208638 | A1* | 10/2004 | Jansen | 398/183 |
| 2005/0100336 | A1* | 5/2005 | Mendenhall et al. | 398/27 |
| 2005/0141660 | A1* | 6/2005 | Kim | 375/355 |
| 2005/0243952 | A1* | 11/2005 | Li | 375/343 |
| 2008/0101515 | A1* | 5/2008 | Yang | 375/359 |
| 2008/0131134 | A1* | 6/2008 | Dreischer et al. | 398/128 |
| 2009/0196613 | A1* | 8/2009 | Linnartz | 398/78 |
| 2010/0070199 | A1* | 3/2010 | Mendenhall et al. | 702/28 |
| 2012/0281990 | A1* | 11/2012 | Caplan | 398/207 |
| 2013/0089339 | A1* | 4/2013 | Liu et al. | 398/152 |
| 2013/0236171 | A1* | 9/2013 | Saunders | 398/26 |
| 2013/0236194 | A1* | 9/2013 | Saunders et al. | 398/163 |

OTHER PUBLICATIONS

Cheng ["Implementation of a Coded Modulation for Deep Space Optical Communications" IEEE Globecom 2006].*
Lee ["Photon Counting Techniques for the Bandlimited Optical Channel" Aerospace Conference IEEE 2005].*
International Search Report for corresponding PCT/US2013/029070 mailed Jun. 14, 2013.
Cheng et al.: *Optimizations of a Hardware Decoder for Deep-Space Optical Communications*; IEEE Transactions on Circuits and Systems; I: Regular Papers, IEEE, US, vol. 55, No. 2, Mar. 1, 2008, pp. 644-658, XP011333062, ISSN: 1549-8328, DOI: 10.1109/TCSI.2007.913733 p. 644-646.

(Continued)

*Primary Examiner* — Oommen Jacob
(74) *Attorney, Agent, or Firm* — Tarolli, Sunheim, Covell & Tummino LLP

(57) ABSTRACT

One embodiment is a Poisson-based communication system. The system includes a receiver that comprises a photodetector that receives photons and generates pulses based on the received photons, a sampling event counter that counts the number of generated pulses by the photodetector and a demodulator. The demodulator samples the sampling event counter at predetermined time intervals to determine an occurrence of a first state when light pulse energy has been transmitted by a transmitter and received by the photodetector and an occurrence of a second state when light pulse energy has not been transmitted by the transmitter and received by the photodetector.

12 Claims, 5 Drawing Sheets

(56) References Cited

OTHER PUBLICATIONS

Quirk K J et al: *Optical PPM Detection with Sample Decision Photon Counting*; Global Telecommunications Conference, 2005. Globecom '05. IEEE St. Loius, MO, USA Nov. 28-Dec. 2, 2005, Piscataway, NJ, USA, IEEE, vol. 1, Nov. 28, 2005, pp. 145-151, XP010881276, DOI: 10.1109/GLOCOM.2005.15777370, ISBN: 978-0-7803-9414-8; the whole document.

Lee et al.: *Photon Counting Techniques for the Bandlimited Optical Channel*; Aerospace Conference, 2005 IEEE, IEEE, Piscataway, NJ, USA, Mar. 5, 2005, pp. 1598-1603, XP031330435, ISBN: 978-0-7803-8870-3; the whole document.

Sun et al.: *Photon Counting with Silicon Avalanche Photodiodes*; Journal of Lightwave Technology, IEEE Service Center, New York, NY, US, vol. 10, No. 8, Aug. 1, 1992, pp. 1023-1032, XP009170220, ISSN: 0733-8724, p. 1023-1026, p. 1029-1030.

Muhammad S S et al.: *Multilevel Modulation and Channel Codes for Terrestrial FSO Links*; Wireless Communication Systems, 2005, $2^{nd}$ International Symposium on Siena, Italy Sep. 5-9, 2005, Piscataway, NJ, USA, IEEE, Piscataway, NJ, USA, Sep. 5, 2005, pp. 795-799, XP010886369, DOI: 10.1109/ISWCS.2005.1547818, ISBN: 978-0-7803-9206-09, pp. 795-796.

Yunfan Li et al.: *WLCp1-09: Transmitted Reference Schemes for Wireless Optical Communications*; Global Telecommunications Conference, 2006. Globecom '06. IEEE, PI, Nov. 1, 2006, pp. 1-5, XP031075904, ISBN: 978-1-4244-0356-1, pp. 1-3.

\* cited by examiner

POISSON-BASED COMMUNICATION SYSTEM AND METHODS

TECHNICAL FIELD

The present invention relates generally to communication, and specifically to Poisson-based communication systems and methods.

BACKGROUND

The current state of the art for applying known Poisson distributed emitters is to immediately convert the received signal into analog form using an optical-to-electrical (OE) conversion device (or circuit). It is then processed using Gaussian based detection rules typically associated with RF communications. The conversion to analog form introduces Gaussian noise into the signal path altering the statistical properties of the original Poisson based signal. The Gaussian approach is popular, however, because it falls back upon well-understood signal processing methodology. The advantages of using Poisson based methodology both in terms of relative simplicity of processing and expanded operating envelope have not been well understood. This is due to some extent to the difficult mathematical analysis of system performance and the lack of low cost implementations.

SUMMARY

In one aspect of the invention, a Poisson-based communication system is provided. The system includes a receiver that comprises a photodetector that receives photons and generates pulses based on the received photons, a sampling event counter that counts the number of generated pulses by the photodetector and a demodulator. The demodulator samples the sampling event counter at predetermined time intervals to determine an occurrence of a first state when light pulse energy has been transmitted by a transmitter and received by the photodetector and an occurrence of a second state when light pulse energy has not been transmitted by the transmitter and received by the photodetector.

In another aspect of the present invention, a Poisson-based communication system is provided that comprises a transmitter and a receiver. The transmitter comprises a symbol mapper that accepts message data or waveforms and converts the message data or waveform into a symbol waveform, an emitter configured to transmit light pulses to a receiver, and a modulator that controls the output of light pulse energy from the emitter based on the symbol waveform. The receiver comprises a photodetector that receives light pulse energy from the emitter and generates pulses based on a number of Poisson distributed events detected by the photodetector, a sampling event counter that counts the number of generated pulses by the photodetector, and a demodulator. The demodulator samples the sampling event counter at predetermined time intervals to determine an occurrence of a first state when transmitted light pulses from the emitter and noise has been detected and received by the photodetector and an occurrence of a second state when only noise has been received and detected by the photodetector.

In accordance with another aspect of the invention, a method is provided for communicating in an optical communication system. The method comprises converting message data or waveforms into a symbol waveform based on an on-off keyed (OOK) format, modulating between transmitting light pulse energy and not transmitting light pulse energy based on the on and off-states of the symbol waveform, and counting a number of received photons over each of a plurality of time intervals associated with the transmitted symbol waveform. The method further comprises determining and assigning an on-state when a count value associated with a given time interval of the plurality of intervals exceeds a predetermined threshold indicating the receipt of transmitted light pulse energy and assigning an off-state to a given time interval of the plurality of intervals indicating no receipt of transmitted light pulse energy.

DETAILED DESCRIPTION

The present invention relates generally to Poisson-based optical communication systems and methods. One aspect of the invention is to utilize a time sampled event counter to capture the numbers of Poisson distributed events (i.e., intensity, number of photons) in a sample interval directly rather than approximating them with analog voltages. This is somewhat similar to the use of an A/D converter which samples a continuous analog process and outputs a digital word corresponding to the input level. In this case, the number of events over a sampling interval is counted. Successive count data outputs then generate a time history of the received process. All counts are exact and do not have any equivalent of the errors associated with A/D conversion (e.g., sample and hold errors and quantization noise).

The present invention enables efficient use of Poisson based emitters in communications applications and exploit their unique statistical properties in order to achieve effective operation over a wide range of operational environments that would otherwise be impractical. Although the most general application for this invention would be to carry data in digital form, it is also easily adapted to carrying analog (non-digitized) signals. The present invention introduces an architecture that introduces new components and processing concepts that allow these systems to exploit the unique properties of Poisson processes to enable operation in both very low signal environments and in the presence of high background noise levels. This methodology can be adapted both to high cost, ultra-high performance systems and mass produced, low cost systems with modest performance.

Figure 1:
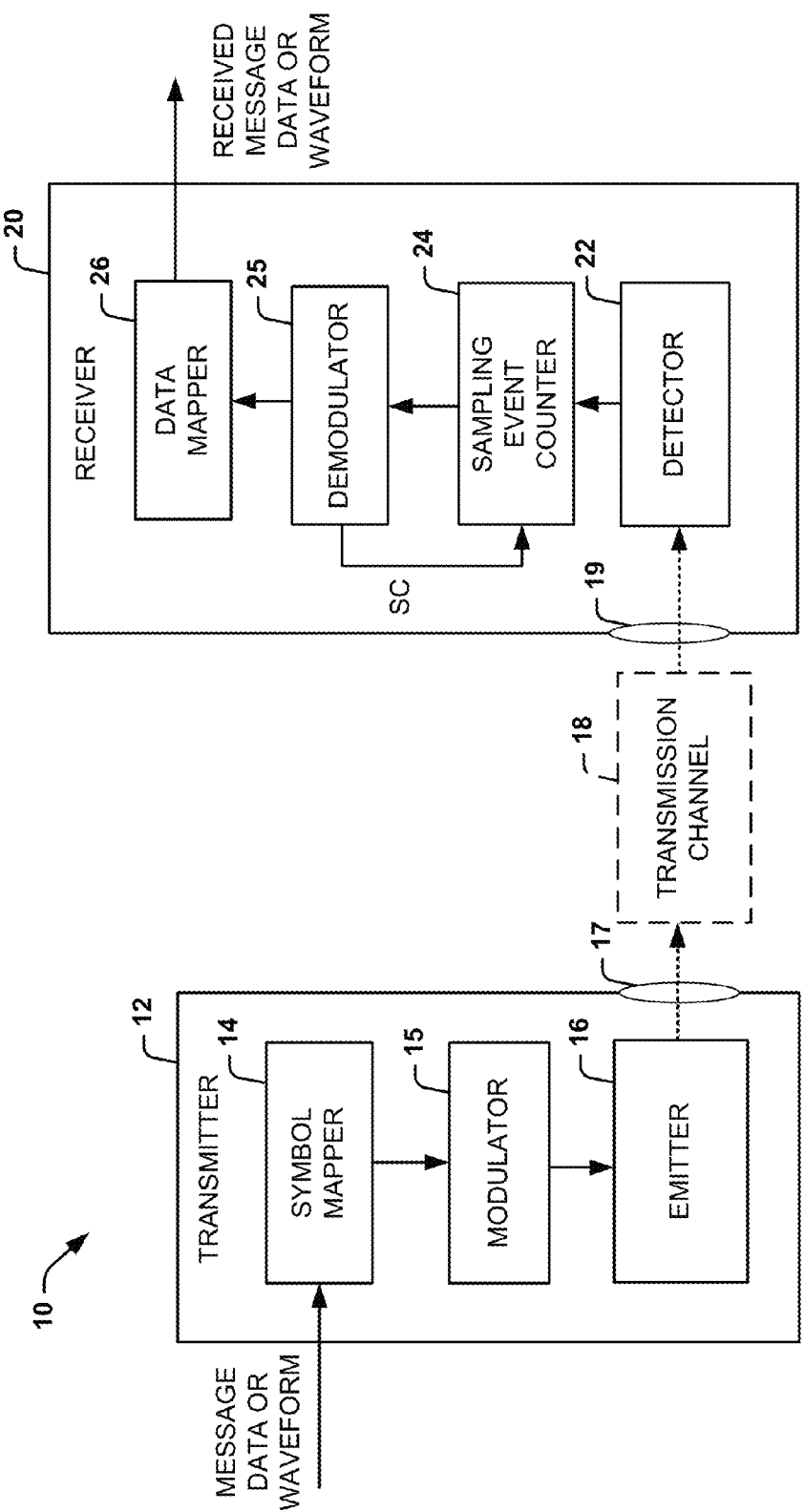
FIG. 1 illustrates an optical communication system in accordance with an aspect of the present invention.

FIG. 1 illustrates an optical communication system 10 in accordance with an aspect of the present invention. The optical communication system 10 includes a transmitter 12 and a receiver 20. The transmitter 12 includes a symbol mapper 14 that accepts message data or waveforms and converts the message data or waveform into a symbol waveform format (e.g., on-off keyed (OOK) format). The symbol waveform is provided to a modulator 15 that controls the output of light pulse energy (e.g., photons) from an emitter 16 through transmitting optics 17 based on the symbol waveform (e.g., on-off-state of symbol waveform). The light energy is then transported through a physical transmission channel 18, such as free space or underwater to the receiver 20. The receiver 20 includes a photodetector 22 that receives the light pulse energy in the form of photons through receiving optics 19. The photodetector 22 outputs a pulse for each received photon (referred to as, each Poisson distributed event) which is counted by a sampling event counter 24.

A demodulator 25 can sample the sampling event counter 24 to determine the count in the sampling event counter 24 that corresponds to the number of Poisson distributed events or photons detected by the photodetector 22. The demodulator 25 includes a control component such as a controller to control the sampling times via a sampling control (SC) signal to the sampling event counter 24. In this manner, the demodulator 25 tunes the sampling to optimize the detection of whether or not output pulses have been transmitted by the emitter 16 and energy that includes the transmitted pulses has been received by the photodetector 22. The on and off transmission, reception and counting provides for the ability to provide for symbol code formatting (e.g., on-off keying) of the message data or waveform sent by the transmitter 12, which can be decoded by the demodulator 25, as will be discussed further below. The demodulator 25 then provides the decoded symbols to a data mapper 26 for mapping of the decoded symbols into the received message data or waveform received by the receiver 20. The demodulator 25 reads the sampling event counter 24 at predetermined intervals to determine if output pulses from the transmitter 12 have been received by the photodetector 22. The demodulator 25 can reset the sampling event counter 24 after each read, or subtract out the previous value of the counter to determine a count value of the sampling event counter 24 associated with the predetermined interval. It is to be appreciated that a variety of other components, such as interface components, timing and power components will be employed by the transmitter 12 and the receiver 20.

In accordance with an aspect of the present invention, waveforms and associated demodulation techniques have been tailored to exploit the unique properties of Poisson process as follows:
1) sample values of a Poisson process are non-negative integers (0 is a valid outcome)
2) the mean value and variance of a Poisson process are identical
3) the standard deviation of a Poisson process is equal to the square root of its mean
4) mean values of distributions add directly: Pois(a)+Pois(b)=Pois(a+b) where a and b are the mean values of the summed Poisson processes.
This last property defines a situation in which signal rides on noise instead of blending into it as with Gaussian noise.

One of the unique properties of the Poisson function is that the shape of its probability distribution function changes with its mean value. For this reason, the use of normalized signal-to-noise (SNR) metrics such as SNR or energy/bit-to-noise (Eb/No) power density cannot be used as the independent variable when computing bit error rate or the fidelity of a received analog signal. Instead, each actual operating point as defined by the mean signal rate and the mean noise rate (denoted as OP(S,N)) needs to be used in these computations.

In an aspect of the invention, each symbol is received by the demodulator 25 in the form of multiple count values from the sampling event counter 24 that have been synchronized to the received symbol waveform. A symbol waveform can represent one or more message bits. The demodulator 25 computes a matched filter response from these count values to optimize the symbol decision process. The shape of its response provides feedback to the sampling event counter 24 to synchronize the sampling of the sampling event counter 24 to the incoming signal waveform, so that the matched filter extracts maximum signal energy counts from the sampling event counter 24. In accordance with an aspect of the present invention, symbol formats can be formed employing a return to zero (RZ) waveform to provide an OOK (on-off keyed) signal for transmitting and receiving message data or waveforms. The RZ waveform (also known as Manchester coded) can employed as a basis for a simple but highly effective transmission scheme. Alternatively, symbol formats can be formed employing a non-return to zero (NRZ) waveform for transmitting and receiving message data or waveforms.

Figure 2:
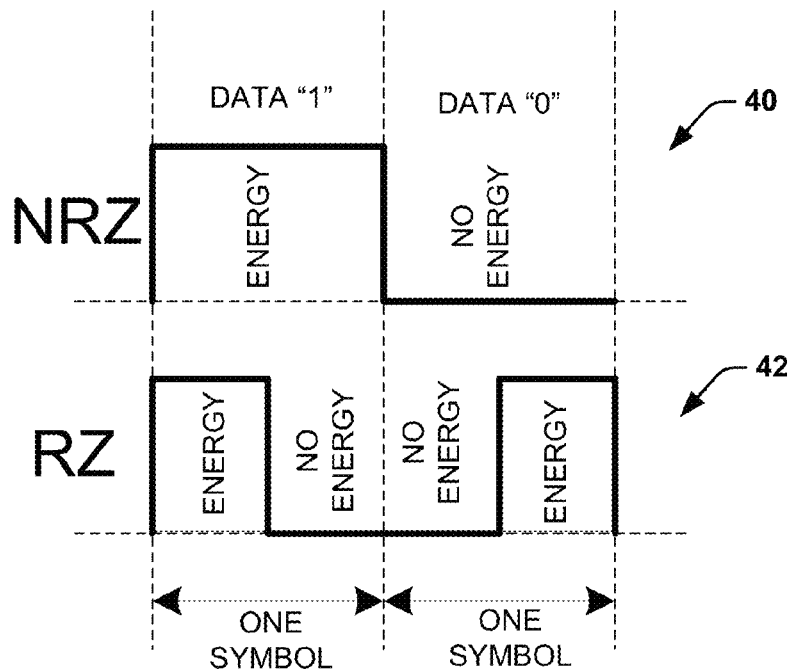
FIG. 2 illustrates a RZ symbol waveform along with an NRZ symbol waveform for providing symbol formats in accordance aspects of the present invention.

FIG. 2 illustrates an a RZ symbol waveform 42 along with an NRZ symbol waveform 40 for providing symbol formats in accordance with aspects of the present invention. As illustrated in FIG. 2 with respect to the NRZ symbol format 40, a first logic state (e.g., logic "1" state) can be provided by transmitting energy (on-state) over a predetermined time period, while a second logic state (e.g., logic "0" state) can be provided by not transmitting energy (off-state) over a predetermined time period. As illustrated in FIG. 2 with respect to the RZ symbol format 40, a first logic state (e.g., logic "1" state) can be provided by transmitting energy (on-state) over a first time interval of a predetermined time period followed by not transmitting energy (off-state) over a second time interval of the predetermined period, and a second logic state (e.g., logic "0" state) can be provided by not transmitting energy (off-state) over a first time interval of a predetermined time period followed by transmitting energy (on-state) over a second time interval of the predetermined time period.

For purposes of the present invention, the RZ symbol format has a number of distinct advantages over the NRZ symbol format, such as a fixed 50% duty cycle, self clocking (there is at least one transition in every symbol), and self thresholding (energy and no-energy states occur in every symbol). Although the following examples will be illustrated with respect to the RZ symbol format, it is to be appreciated other embodiments of the present invention could employ the NRZ symbol format, or other symbol formats (e.g., higher order symbol formats).

Referring again to FIG. 1, counts are made during each half of the RZ symbol received at the photodetector 22. One half of the RZ symbol will include counts generated by the received optical energy summed with the internal noise counts generated by the detector. The mean value will be S+N. The other half of the RZ symbol will have counts from the detector noise alone with its mean value being N. The relationship is shown for one RZ symbol in the waveform 50 in FIG. 3. The demodulator 25 can check the counts with a predetermined count value to determine if the half of the RZ symbol is in the on-state or off-state.

Figure 3:
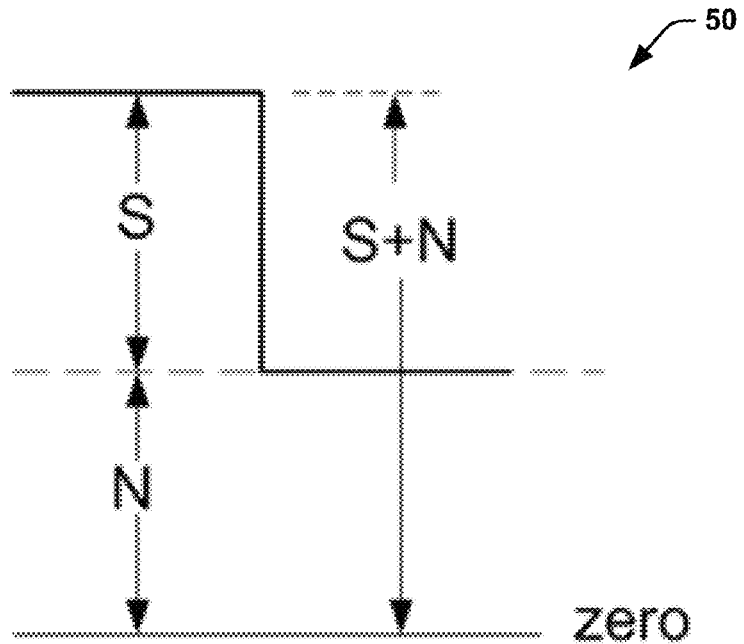
FIG. 3 illustrates a mean value count waveform representation of an RZ symbol in accordance with an aspect of the present invention.

In accordance with one aspect of the invention, bit decisions use the following simple rule: compare the number of counts in the first half and second half of the symbol; if the first half is larger, the symbol is declared to be a first logic state (e.g., logic "1"), and if the second half is equal or larger, the symbol is declared to be a second logic state (e.g., logic "0"). For example, when a logic "1" is sent, the counts in the first half will have a mean value equal to the sum of means of the received signal and of the detector noise generated during that time interval of a given time period; and the counts in the second half will have a mean value equal to that of the detector noise alone in the second time interval of the given time period. As shown in FIG. 3, Pois(S+N) denotes the Poisson process during the signal half of the symbol and Pois(N) denotes the Poisson process during the noise only half. It is to be appreciated that the logic states can be reversed such that a logic "1" is based on energy being received in the second half of the symbol and a logic "0" being based on energy being received in the first half of the symbol.

Figure 4:
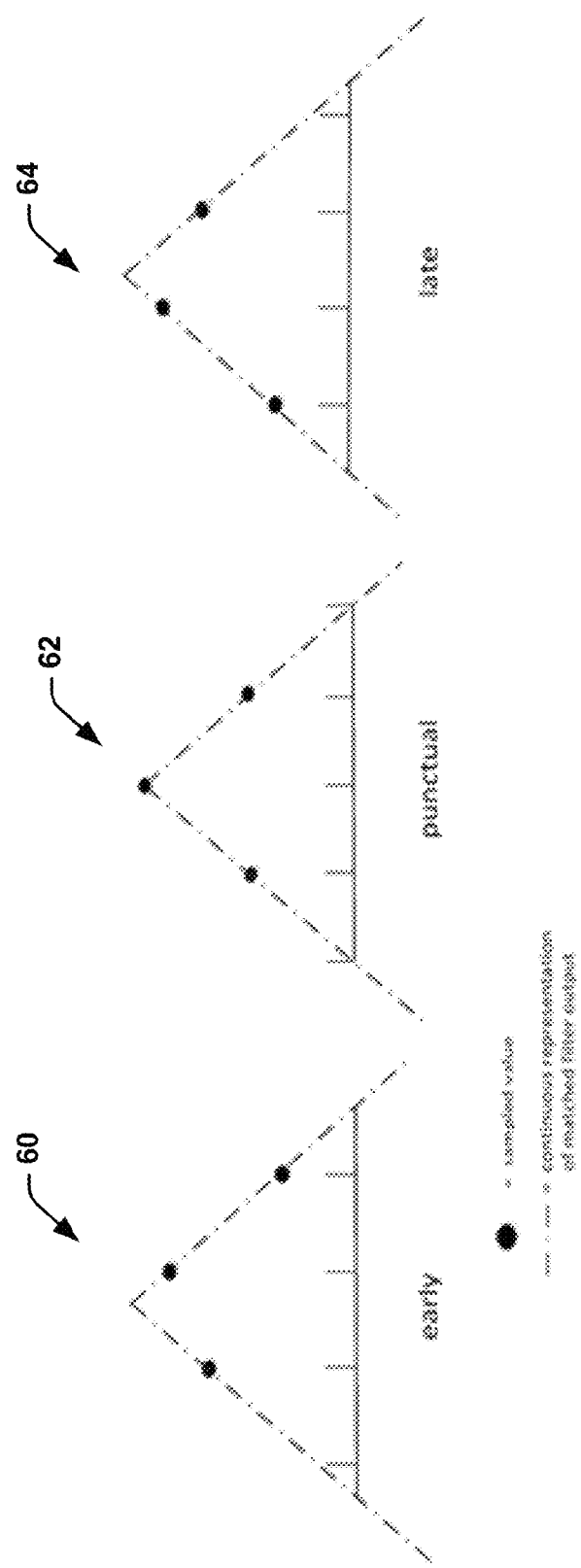
FIG. 4 illustrates a set of exemplary matched filter output waveforms.

Timing errors between the sampling process and the incoming waveform are estimated by measuring the symmetry of a matched filter's output waveform residing in the demodulator 25. FIG. 4 illustrates a set of exemplary matched filter output waveforms. A desired alignment results in a time symmetric output as illustrated in a punctual matched filter output waveform 62. Asymmetry denotes that the sampling is either "early" as illustrated in early matched filter output waveform 60, or "late" as illustrated in late matched filter output waveform 64. The amount of relative asymmetry provides an estimate of the extent of the error. Timing error estimates form the basis of a correction signal that is fed back to the sample timing generator, such as a Digital Direct Synthesizer. Small timing errors do not significantly degrade performance and so it is not necessary to continually eliminate the timing error completely. For this reason, the estimation/correction process does not have to run continuously but rather at user defined intervals (e.g. several time per second). The error signal is generally noisy and filtering is applied to smooth the estimate before it is used as a correction.

Figure 5:
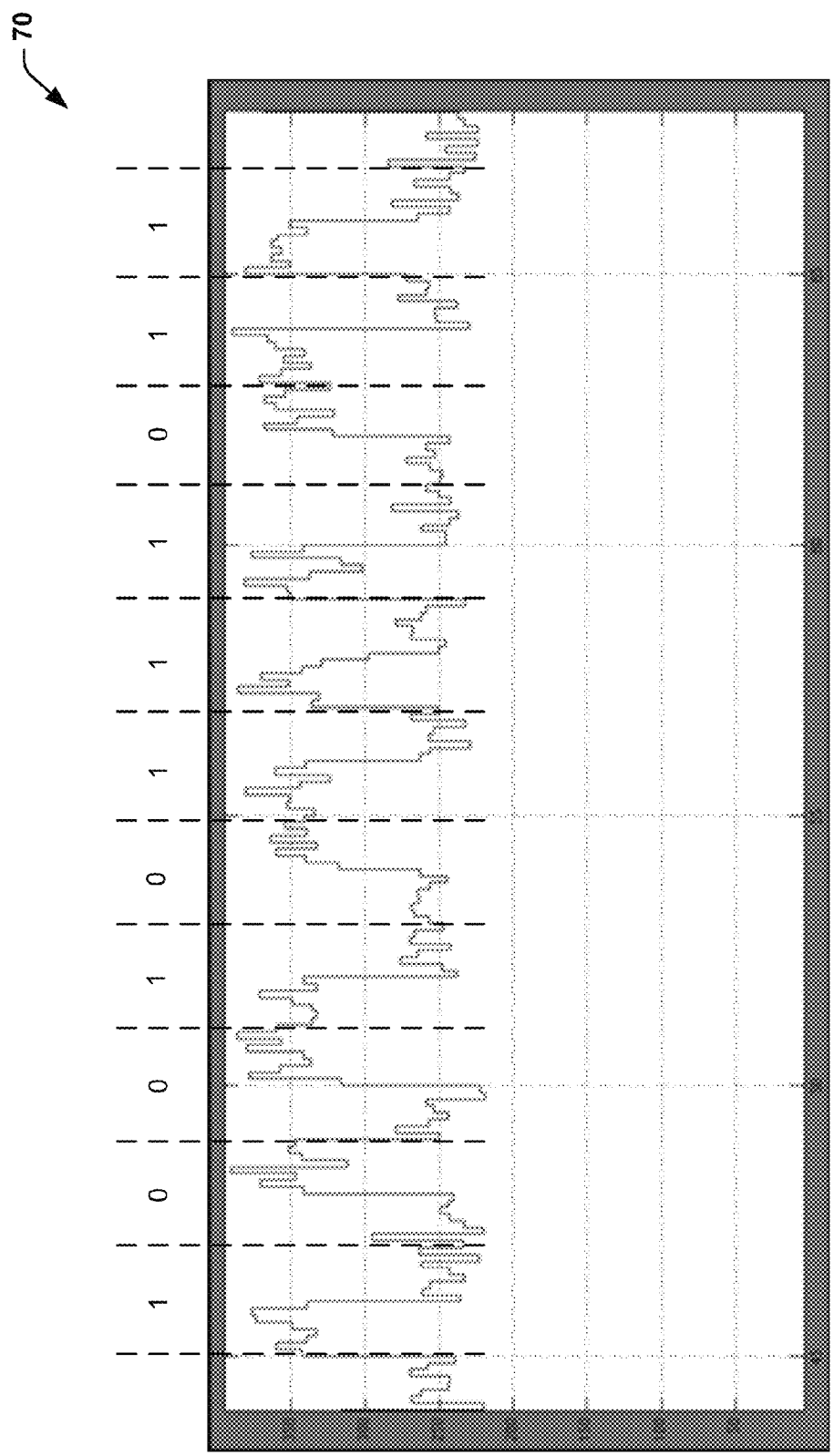
FIG. 5 illustrates a RZ symbol waveform in accordance with an aspect of the present invention.

FIG. 5 illustrates a RZ symbol waveform 70 in accordance with an aspect of the present invention. The RZ symbol waveform 70 has a mean arrival rate of 100 counts/sec in the presence of background noise having a mean arrival rate of 250 counts/sec. With proper signal waveform design and detection processing, signals can readily be extracted from background noise permitting effective operation under conditions that would otherwise be impractical. As illustrated in FIG. 5, the RZ symbol waveform 70 includes a sequence of symbols that form a binary pattern of logic "1"s and "0"s (i.e., "10010111011"). As shown, symbols with logic "1"s includes signal energy and noise over a first time interval followed by no signal energy with only noise over a second time interval. Symbol's with logic "0"s include no signal energy with only noise over a first time interval followed by signal energy and noise over the second time interval. It is to be appreciated that noise includes noise from not only the photodetector and other components of the communication system, but also light from other sources besides the transmitter.

Figure 6:
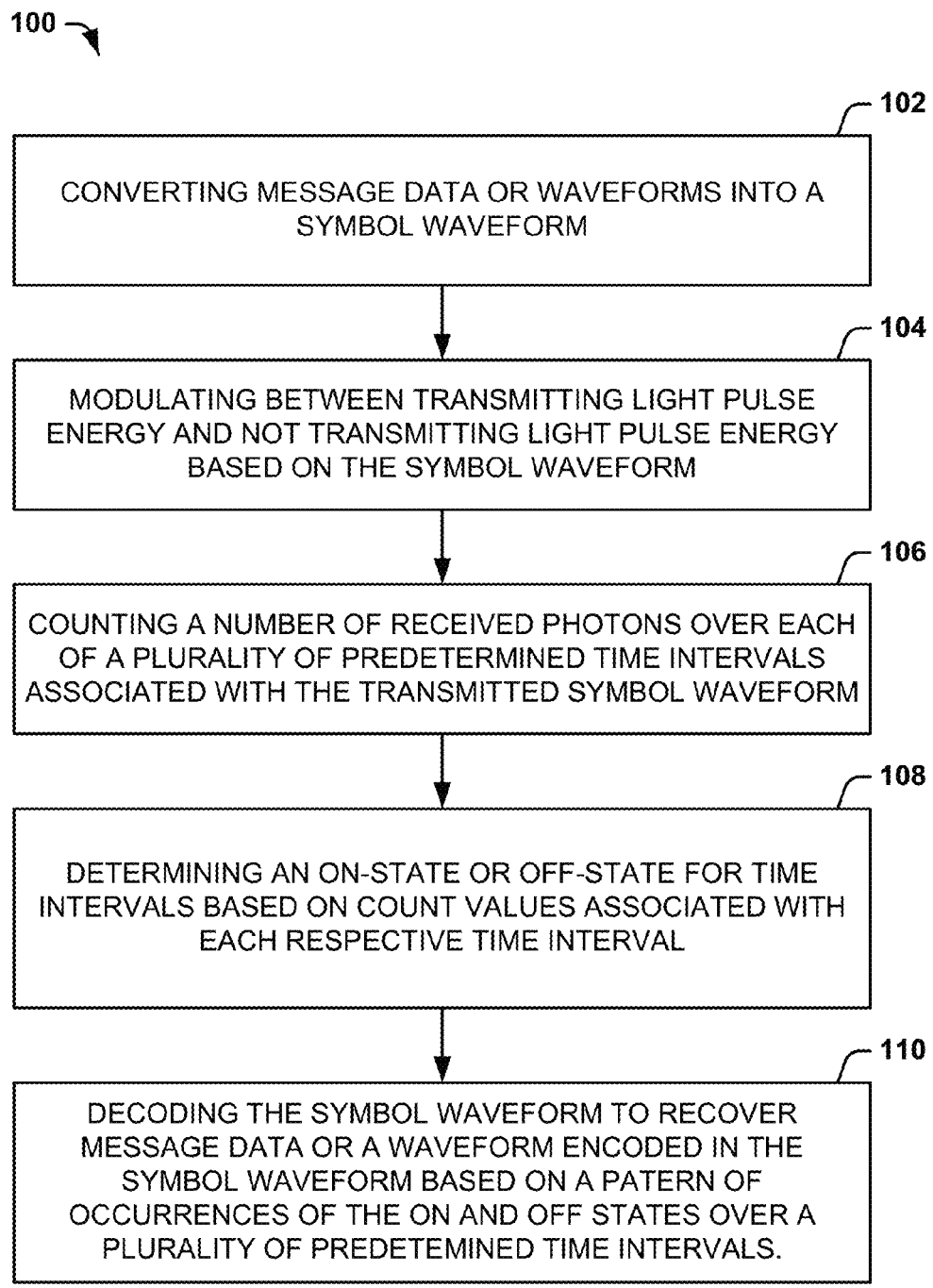
FIG. 6 illustrates an example of a method for communicating in an optical communication system in accordance with an aspect of the invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 100 for communicating in an optical communication system in accordance with an aspect of the invention. The method 100 begins at 102, where message data or waveforms are converted into a symbol waveform. The symbol waveform can include one or more symbols. The symbol waveform can conform to an on-off keyed format, such as, for example, an RZ format or an NRZ format. AT 104, the transmitting of light pulse energy is modulated between transmitting light pulse energy and not transmitting light pulse energy based on the symbol waveform. The methodology 100 then proceeds to 106. At 106, a number of received photons associated with the transmitted symbol waveform are counted over each of a plurality of predetermined count intervals. At 108, an on-state or off-state is determined for each time interval based on the count values associated with each respective time interval. At 110, the symbol waveform is decoded to recover the message data or waveform encoded in the symbol waveform based on a pattern of occurrences of the on-state and off-states over the plurality of predetermined intervals.

For example, a given logic state can be determined based on whether a time interval within a time period had been determined to be in an on-state followed by a time interval in an off-state (e.g., logic "1"), or based on whether a time interval within a time period had been determined to be in an off-state followed by a time interval in an on-state (e.g., logic "0") (i.e., RZ format). Alternatively, an on-state can be determined when a count value exceeds a predetermined threshold and an off-state can be determined when a count value is at or below the predetermined threshold. A given logic state can then be determined based on whether a time period had been determined to be in an on-state (e.g., logic "1") or in an off-state (e.g., logic "0") (i.e., NRZ format). Furthermore, logic states can be determined based on whether or not a count value is greater than or less than a count value of a subsequent time interval. It is to be appreciated that a variety of symbol formats and decoding techniques can be employed to carry out the present invention.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A Poisson-based communication system comprising:
   a receiver comprising:
   a photodetector that receives photons and generates pulses based on the received photons;
   a sampling event counter that counts the number of generated pulses by the photodetector; and
   a demodulator configured to:
   sample the sampling event counter at predetermined time intervals to determine an occurrence of a first state when light pulse energy has been transmitted by a transmitter and received by the photodetector and an occurrence of a second state when light pulse energy has not been transmitted by the transmitter and received by the photodetector;
   decode a symbol waveform to recover message data or a waveform encoded in the symbol waveform that is based on a pattern of the occurrences of the first state and the second state over a plurality of predetermined time intervals, wherein the symbol waveform is based on one of a return to zero (RZ) format; and
   compute a matched filter response from count values of the sampling event counter and uses the shape of this reponse to provide feedback to the sampling event counter to synchronize the sampling of the sampling event counter to an incoming symbol waveform corresponding to a pattern of occurences of the first state and second states to maximize received signal energy counts from the sampling event counter.

2. The system of claim 1, wherein the symbol waveform is based on an on-off keyed (OOK) format.

3. The system of claim 1, wherein the demodulator determines a first logic state when the occurrence of the first state is determined at a first predetermined time interval of a given predetermined time period followed by the determination of the occurrence of the second state at a second predetermined time interval of the given predetermined time period, and the demodulator determines a second logic state when the occurrence of the second state is determined at a first predetermined time interval of a given predetermined time period followed by a determination of the occurrence of the first state at a second predetermined time interval of the given predetermined time period.

4. The system of claim 1, wherein the count value sampled by the demodulator associated with the first state is based both on a signal associated with light pulse energy transmitted from the transmitter and noise detected by the photodetector and the count value sampled by the demodulator associated with the second state is based only on noise detected by the photodetector.

5. The system of claim 1, wherein the demodulator determines a first logic state when count value determined at a first predetermined time interval of a given predetermined time period is greater than a count value determined at a second predetermined time interval of the given predetermined time period that is subsequent to the first predetermined time interval, and the demodulator determines a second logic state when count value determined at a first predetermined time interval of a given predetermined time period is less than a count value determined at a second predetermined time interval of the given predetermined time period subsequent to the first predetermined time interval.

6. The system of claim 1, further comprising:
a transmitter comprising:
a symbol mapper that accepts message data or waveforms and converts the message data or waveform into a symbol waveform; and
a modulator that controls the output of light pulse energy from an emitter to the receiver based on the symbol waveform.

7. A Poisson-based communication system comprising:
a transmitter comprising:
a symbol mapper that accepts message data or waveforms and converts the message data or waveform into a symbol waveform;
an emitter configured to transmit light pulses to a receiver; and
a modulator that controls the output of light pulse energy from the emitter based on the symbol waveform; and
a receiver comprising:
a photodetector that receives light pulse energy from the emitter and generates pulses based on a number of Poisson distributed events detected by the photodetector;
a sampling event counter that counts the number of generated pulses by the photodetector; and
a demodulator configured to:
sample the sampling event counter at predetermined time intervals to determine an occurrence of a first state when transmitted light pulses from the emitter and noise has been detected and received by the photodetector and an occurrence of a second state when only noise has been received and detected by the photodetector;
decode a symbol waveform to recover message data or a waveform encoded in the symbol waveform that is based on a pattern of the occurrences of the first state and the second state over a plurality of predetermined time intervals, wherein the symbol waveform is based on a return to zero (RZ) format; and
compute a matched filter response from count values of the sampling event counter and employ the shape of this reponse to provide feedback to the sampling event counter to synchronize the sampling of the sampling event counter to an incoming symbol waveform corresponding to a pattern of the first state and second state to maximize received signal energy counts from the sampling event counter.

8. The system of claim 7, wherein the demodulator determines a first logic state when the occurrence of the first state is determined at a first predetermined time interval of a given predetermined time period followed by the determination of the occurrence of the second state at a second predetermined time interval of the given predetermined time period, and the demodulator determines a second logic state when the occurrence of the second state is determined at a first predetermined time interval of a given predetermined time period followed by a determination of the occurrence of the first state at a second predetermined time interval of the given predetermined time period.

9. The system of claim 7, further comprising a data mapper that receives decoded symbols from the demodulator and maps the decoded symbols into received message data or a received waveform.

10. A method for communicating in an optical communication system, the method comprising:
converting message data or waveforms into a symbol waveform based on an on-off keyed (OOK) format;
modulating between transmitting light pulse energy and not transmitting light pulse energy based on the on and off-states of the symbol waveform;
counting, at a sampling event counter, a number of received photons over each of a plurality of time intervals associated with the transmitted symbol waveform;
determining and assigning, at the sampling event counter, an on-state when a count value associated with a given time interval of the plurality of intervals exceeds a predetermined threshold indicating the receipt of transmitted light pulse energy and assigning an off-state to a given time interval of the plurality of intervals indicating no receipt of transmitted light pulse energy;
decoding the symbol waveform to recover message data or a waveform encoded in the symbol waveform based on a pattern of the occurrences of the on and off-states over the plurality of predetermined time intervals, wherein the symbol waveform is based on a return to zero (RZ) format; and
computing a matched filter response from count values counted by the sampling event counter and employ the shape of this reponse to provide feedback to the sampling event counter to synchronize the determining and assiginig by the sampling event counter to an incoming symbol waveform corresponding to a pattern of the on and off states to maximize received signal energy counts from the sampling event counter.

11. The method of claim 10, further comprising determining a first logic state when the occurrence of the on-state is determined at a first predetermined time interval of a given predetermined time period followed by the determination of the occurrence of the off-state at a second predetermined time interval of the given predetermined time period, and the determining a second logic state when the occurrence of the off-state is determined at a first predetermined time interval of a given predetermined time period followed by a determination of the occurrence of the on-state at a second predetermined time interval of the given predetermined time period.

12. The method of claim 11, wherein the count value of the photons associated with the first state is based both on a signal associated with light pulse energy and noise and the count value of the photons associated with the second state is based only on noise.

* * * * *